(12) United States Patent
Andrieux et al.

(10) Patent No.: US 8,890,380 B2
(45) Date of Patent: Nov. 18, 2014

(54) ELECTRICAL CONNECTOR ASSEMBLY FOR A BRUSHLESS MOTOR

(75) Inventors: Gaël Andrieux, Sonceboz (CH); Daniel Sigg, Sonceboz (CH)

(73) Assignee: Sonceboz Automotive SA, Sonceboz (CH)

(*) Notice: Subject to any disclaimer, the term of this patent is extended or adjusted under 35 U.S.C. 154(b) by 292 days.

(21) Appl. No.: 12/743,445

(22) PCT Filed: Nov. 19, 2008

(86) PCT No.: PCT/FR2008/001619
§ 371 (c)(1),
(2), (4) Date: Aug. 11, 2010

(87) PCT Pub. No.: WO2009/098382
PCT Pub. Date: Aug. 13, 2009

(65) Prior Publication Data
US 2011/0057524 A1    Mar. 10, 2011

(30) Foreign Application Priority Data
Nov. 19, 2007 (FR) ...................... 07 08111

(51) Int. Cl.
*H02K 3/52* (2006.01)
*H02K 3/46* (2006.01)
*H02K 29/08* (2006.01)
*H02K 5/22* (2006.01)

(52) U.S. Cl.
CPC ............... *H02K 3/522* (2013.01); *H02K 29/08* (2013.01); *H02K 5/225* (2013.01)
USPC .......................... 310/71; 310/68 B

(58) Field of Classification Search
USPC .................................. 310/71, 68 B
See application file for complete search history.

(56) References Cited

U.S. PATENT DOCUMENTS

| 4,287,446 | A | * | 9/1981 | Lill et al. ........................ 310/71 |
| 4,689,023 | A | * | 8/1987 | Strong et al. .................. 439/189 |
| 5,770,902 | A | * | 6/1998 | Batten et al. ..................... 310/71 |
| 5,932,942 | A | * | 8/1999 | Patyk et al. ...................... 310/58 |
| 6,600,244 | B2 | * | 7/2003 | Okazaki et al. ................. 310/71 |
| 6,914,356 | B2 | * | 7/2005 | Yamamura et al. ............. 310/71 |
| 6,924,570 | B2 | * | 8/2005 | De Filippis et al. ............ 310/71 |
| 6,949,848 | B2 | * | 9/2005 | Yamada et al. ................. 310/71 |
| 7,045,920 | B2 | | 5/2006 | Ohuchi et al. |
| 7,196,443 | B2 | * | 3/2007 | Kimura et al. ................. 310/71 |

(Continued)

FOREIGN PATENT DOCUMENTS

EP    1 677 404 A2    7/2006
EP    1 727 261 A1    11/2006

(Continued)

*Primary Examiner* — Burton Mullins
(74) *Attorney, Agent, or Firm* — Arent Fox LLP

(57) ABSTRACT

The invention relates to an electrical connector assembly for a brushless electromagnetic motor, comprising a 3-phase electrical stator winding and X windings per phase, connected in series or in parallel, characterized in comprising a circular wire guide with slots designed to hold the ends of the wires of the windings and a connector support comprising at least three circular connector tracks, three of said tracks being each terminated with a thimble and which are axially extended by wire grips to ensure the electrical contact for the 3 phases of the motor through the slots of the wire guides and wherein the thimbles exit the motor via a connector.

5 Claims, 9 Drawing Sheets

(56) References Cited

U.S. PATENT DOCUMENTS

Figure 1:
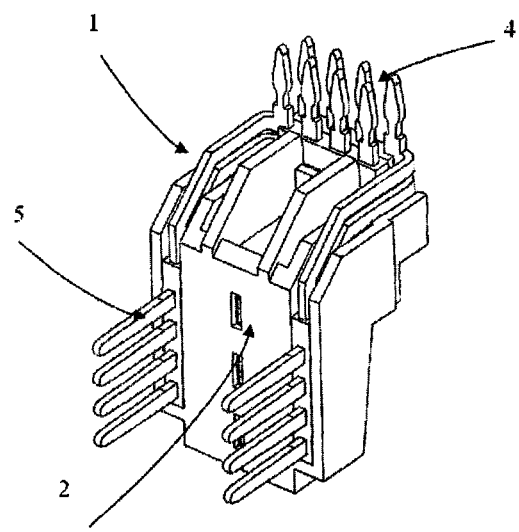

| | | | |
|---|---|---|---|
| 7,262,529 B2 * | 8/2007 | Klappenbach et al. | 310/71 |
| 7,309,936 B2 * | 12/2007 | Utsumi et al. | 310/71 |
| 7,374,462 B2 * | 5/2008 | Kobayashi | 439/723 |
| 7,498,702 B2 * | 3/2009 | Migita et al. | 310/71 |
| 7,518,853 B2 * | 4/2009 | Kato et al. | 361/637 |
| 7,595,572 B2 * | 9/2009 | Haga et al. | 310/71 |
| 7,692,356 B2 * | 4/2010 | Bott et al. | 310/260 |
| 7,723,878 B2 * | 5/2010 | Yagai et al. | 310/71 |
| 8,035,263 B2 * | 10/2011 | Kienzler et al. | 310/71 |
| 2003/0201688 A1 | 10/2003 | Yamamura et al. | |
| 2004/0066103 A1 | 4/2004 | Ohuchi et al. | |
| 2006/0232143 A1 * | 10/2006 | Purvines et al. | 310/43 |
| 2007/0170792 A1 | 7/2007 | Bott et al. | |

FOREIGN PATENT DOCUMENTS

| | | | | |
|---|---|---|---|---|
| JP | 2000-224801 | * | 8/2000 | H02K 5/22 |
| JP | 2000-224801 A | | 8/2000 | |
| JP | 2003-294488 | * | 10/2003 | G01D 5/245 |
| WO | WO 03/001647 A1 | | 1/2003 | |

* cited by examiner

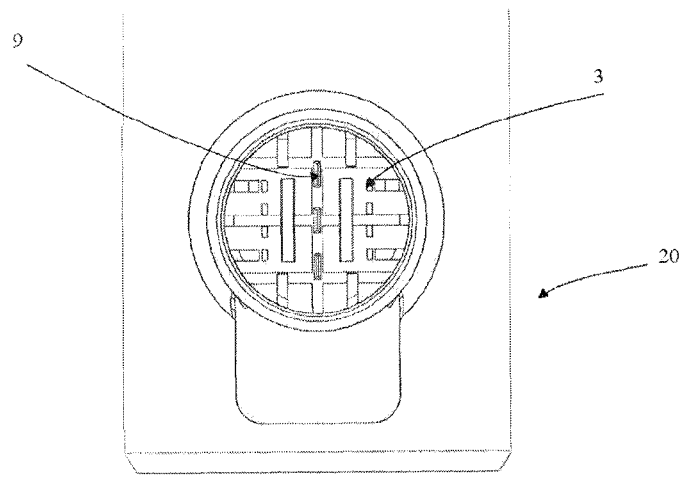
Figure 13
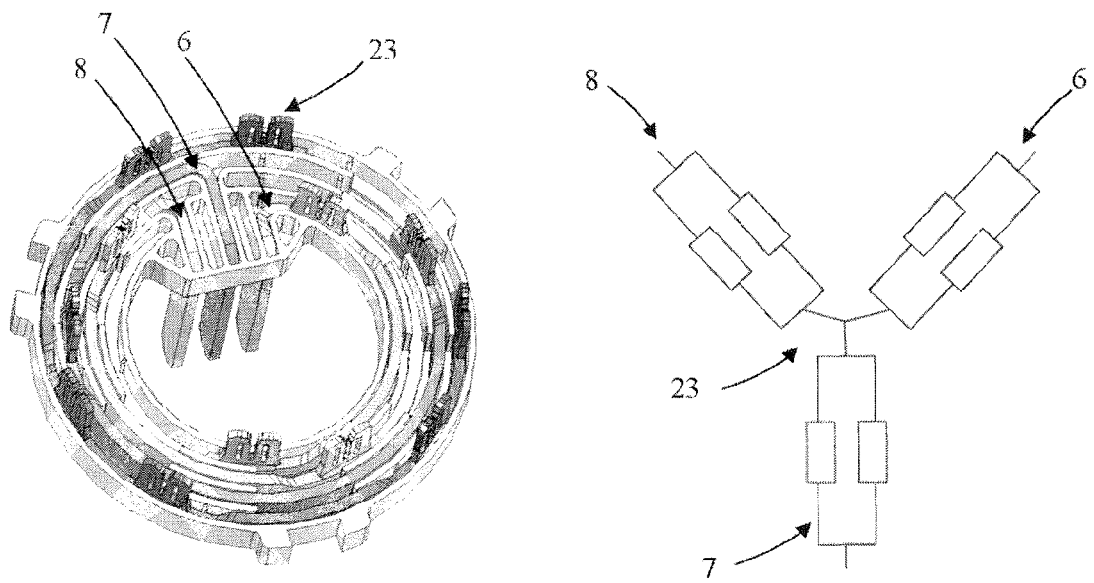
Figure 14a
Figure 14b

ELECTRICAL CONNECTOR ASSEMBLY FOR A BRUSHLESS MOTOR

CROSS-REFERENCED TO RELATED APPLICATION

This application is a National Stage entry of International Application No. PCT/FR2008/001619, filed Nov. 19, 2008, which claims priority to French patent Application No. 0708111, filed Nov. 19, 2007, the disclosure of the prior application is incorporated in its entirety by reference.

The present invention relates to the field of brushless electromagnetic motors and more particularly the electrical connection means of such motors. The invention more particularly provides for motors having a diameter of a relatively small size (typically <F50 mm), an assembly of connectors comprising a single external connector with N electrical connection plugs designed for connecting three electrical phases with X windings per phase, controlling the motor and Y encoding signals managing for example the position of the rotor of said motor, with N being equal to 3+Y and this with a minimum number of parts.

Brushless electromagnetic motors have an assembly of electric excitation windings generally configured for providing a poly-phase supply. In the case of 3-phase motors, there are 3X windings to be connected, if X is the number of windings per phase, connected in series or in parallel, with a star or a triangle configuration.

In the prior art, solutions are known for, on the one hand connecting the windings together and, on the other hand, connecting the three connections required for the supply of the 3 phases. For example, document EP01677404 (Hitachi) provides means for connecting windings in the form of rings connecting the windings and connection means in the form of a laterally shifted connector providing the connection with the rings. For small dimensions, using at least two assemblies of parts which must be connected by welding or by force, i.e. the rings and the connector, results in a multiplicity of parts and connections which raises the cost of such a solution. In addition, this patent entails the use of an encoder, so as to know the position of the motor and so as to be able to drive it. This encoder also requires auxiliary connection means. In the end, the number of connections and connectors is high and does not make it possible to provide a compact assembly or to minimise the risk of failure.

Similarly, document U.S. Pat. No. 7,045,920 (Hitachi) is also known which provides in the prior art connectors in the shape of copper tracks which are cut in copper sheets and bent on the parts intended to provide the electrical connection with the windings. The tracks are fixed above the windings and, if need be, in a support receiving such tracks, such as for example in the patent EP01727261 (Papst) or patent US20070170792 (Siemens). In such patents, the number of parts required is very high and the problem of the required encoder still remains for these motors which require additional connections and a connector. In addition, cutting such tracks in copper sheets requires important quantities of material, so as to be able to provide the number of tracks required. Finally, the manufacturing cost is high.

The present invention aims at answering the problems discussed hereabove by providing an advantageous connection solution making it possible to bring down the three electrical phases of a motor to X windings per phase, connected in series or in parallel and having a triangular or a star configuration to a connector with three thimbles with a limited number of parts.

For this purpose, the 3 electrical phases are supplied by at least three electrical plugs which are, as for the main part, in the shape of a rectangular section track with a circular shape, with the motor revolution axis as the centre. Such track is axially extended by at least two wire grips which come in contact with the ends of the electrical windings. Such track having a circular shape is also radially extended by a thimble intended to exit through a connector, laterally with respect to the motor. Each electrical plug makes it possible to connect an electrical phase with the appropriate number of wire grips. In the case of the triangular shaped winding with two parallel windings per phase, each electrical plug includes four wire grips which each connect a thimble with four different windings.

During the phase of the connection of wire grips on the thimbles of the windings, such thimbles are held in position with a wire guide in the shape of a part, for example made of plastic material, which is circular and has slots making it possible for the wire grips of the electrical plugs to go through such wire guide, so as to provide an electrical connection.

The three electrical plugs for the connection of the motor windings are grouped on a connector support holding such three plugs with respect to each other. The three thimbles at the ends of the plugs are advantageously axially shifted with respect to the each other, so as to be axially aligned at the connector outlet. Thus, there is no overlapping track.

Finally and in the case of a parallel triangular configuration, there is only one continuous part per phase enabling the electrical supply from the connector where the power supply comes up to the electrical windings receiving the power.

Thus, the present invention claims an electrical connector assembly for a brushless electromagnetic motor comprising a 3-phase electrical stator winding and X windings per phase connected in series or in parallel, characterised in that it comprises a circular wire guide with slots intended to hold the ends of the wires of the windings and a connector support comprising at least three circular copper tracks, three of said tracks being each terminated with a thimble and which are axially extended by wire grips to ensure the electrical contact for the 3 phases of the motor through the slots of the wire guide and wherein the thimbles exit the motor via a connector.

The invention also aims at providing a solution for the connection of an assembly of Y signals (for example those from Hall probes) belonging to an encoder intended to detect the position of the rotor of said motor from a printed circuit to such connector.

For this purpose, the encoder advantageously is in the shape of at least one magnetised circular track connected to the rotor and having alternations of North-South magnetic poles associated with at least two Hall probes positioned on a printed circuit in the direct axial proximity of the magnetised track and detecting the evolution of the magnetic induction generated by the magnetised track. The electrical management (supply and reading of signals) of the Hall probes is provided by an assembly of Y plugs which start at the printed circuit and exit the motor and laterally to a connector.

An object of the invention is also to provide a connector assembly characterised in that the three electrical connectors of the motor and the Y plugs of the encoder belong to the same connector.

So as to provide a compact embodiment, such connector is in the shape of a parallelepiped matrix. In the centre of the connector are advantageously connected three openings intended it receive the three thimbles of the motor electrical supply plugs. Y openings are distributed on each side and intended to receive the Y plugs used for managing the encoder probes. The connector thus has an assembly of 3+Y openings grouped in a minimum space and on the same surface.

Another object of the invention is also to provide a connector method with small dimensions and a low global resistivity, so as to be able to be used mainly for small-sized motors without generating significant electric potential losses.

Another object of the invention is to provide a connector composed of wound conductive tracks making it possible to generate gains in production costs.

Another object of the invention is to provide a connector grouping the electric connections of the motor and the encoder which has a lateral exit with respect to the motor axis so as to provide a compact embodiment.

Another object of the invention is to provide a compact over-moulded motor+connector assembly intended to actuate an external load.

Another object of the invention is finally to provide a connector connecting an encoder composed of two concentric circular magnetised tracks, each having a different number of North-South alternations and associated each with magnetic field measuring probes, so as to make possible a varied driving mode (start, continuous operation).

Figure 2:
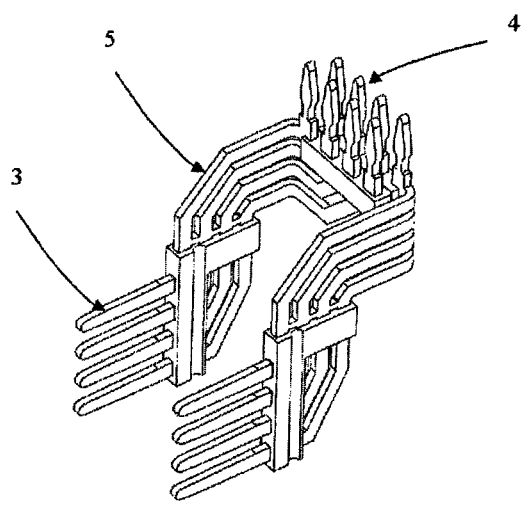
Figure 3:
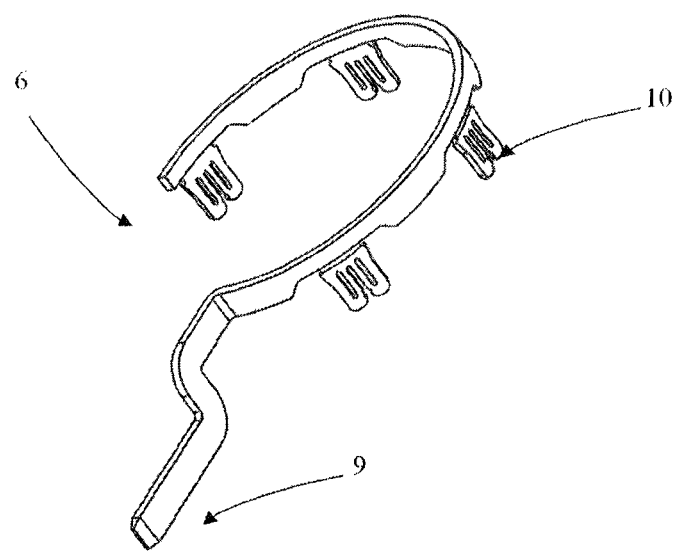
Figure 4:
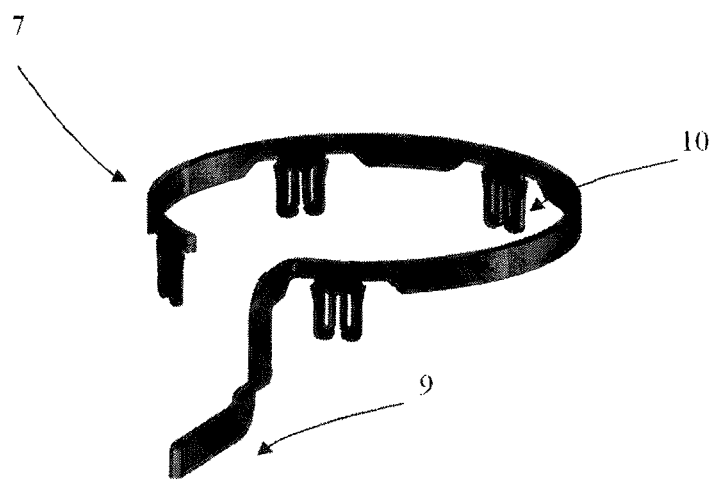
Figure 5:
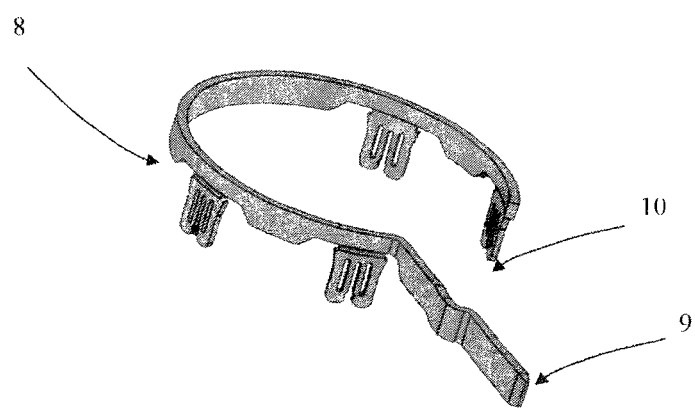
Figure 6:
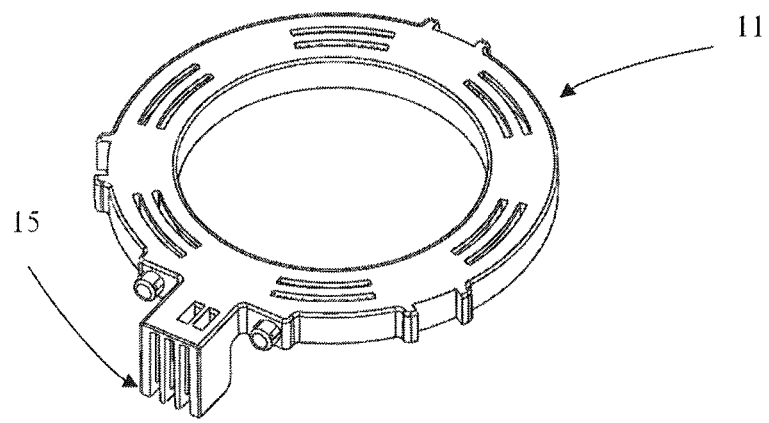
Figure 7:
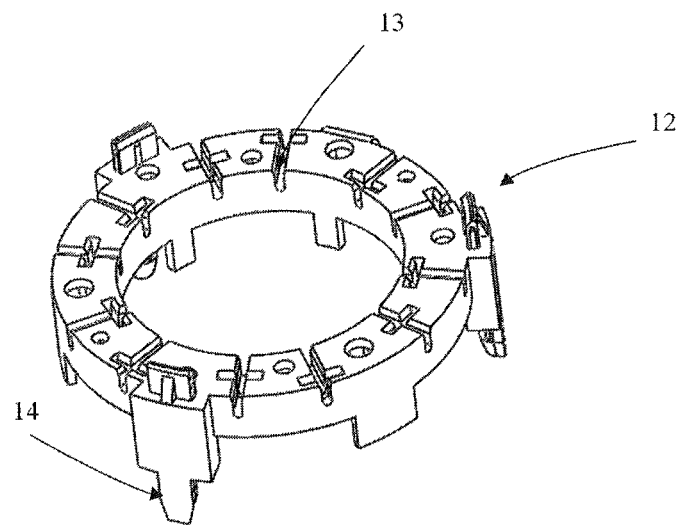
Figures 8A, 8B:
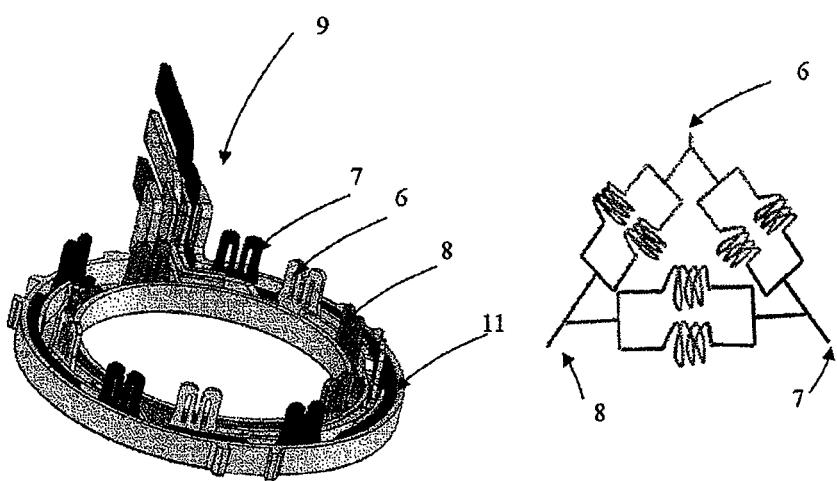
Figure 8C:
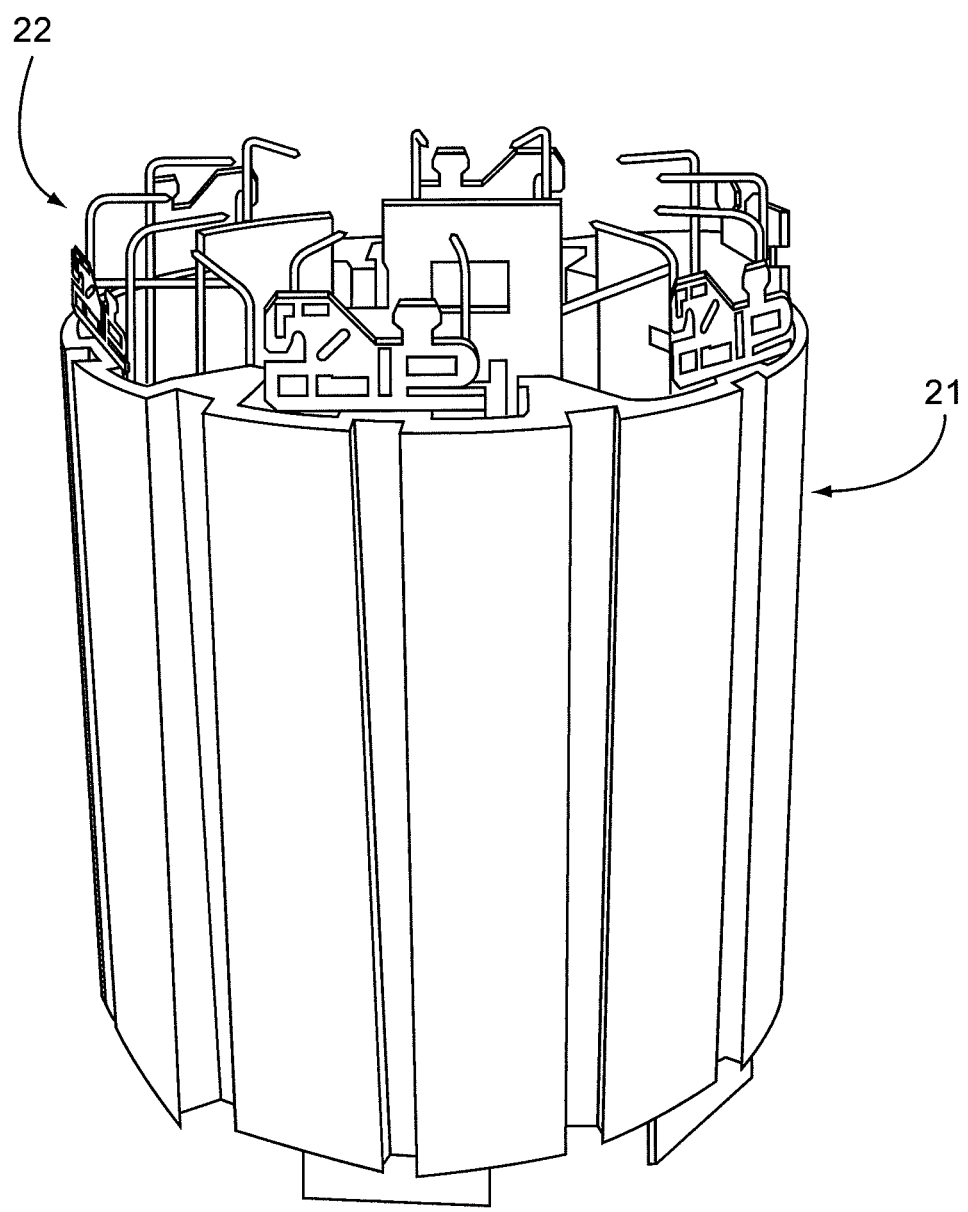
Figure 9:
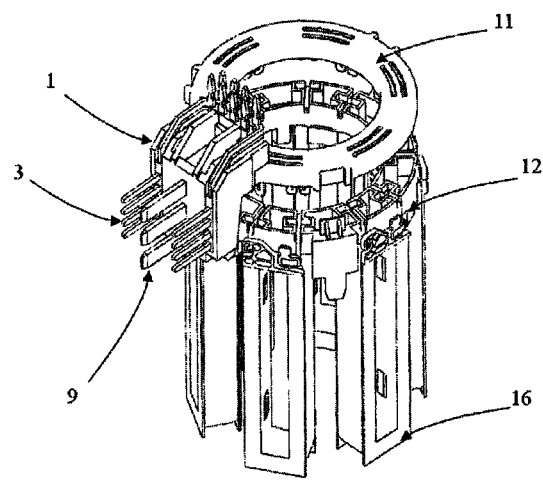
Figure 10:
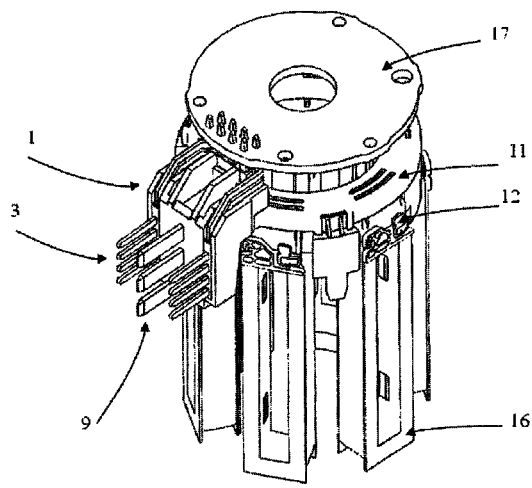
Figure 11:
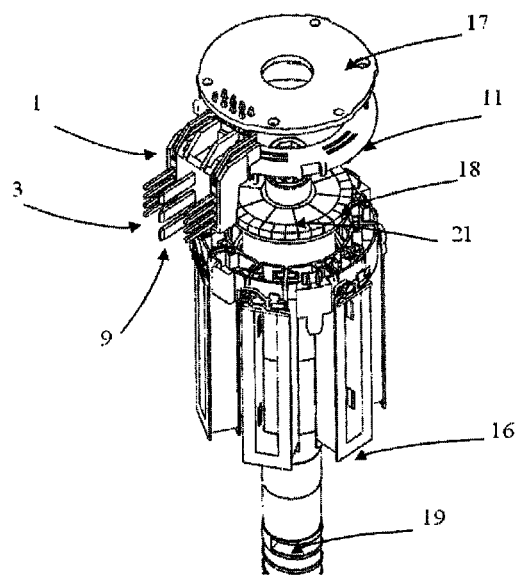
Figure 12:
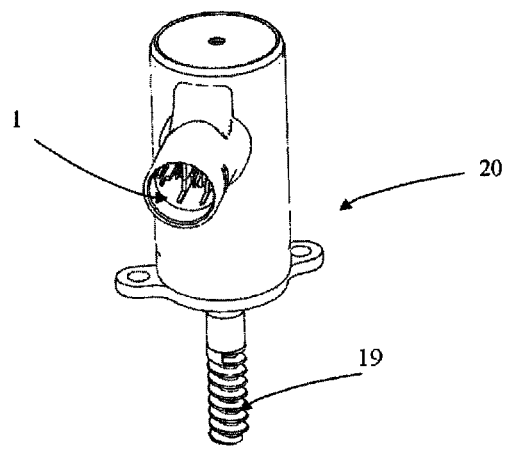
Figure 15A:
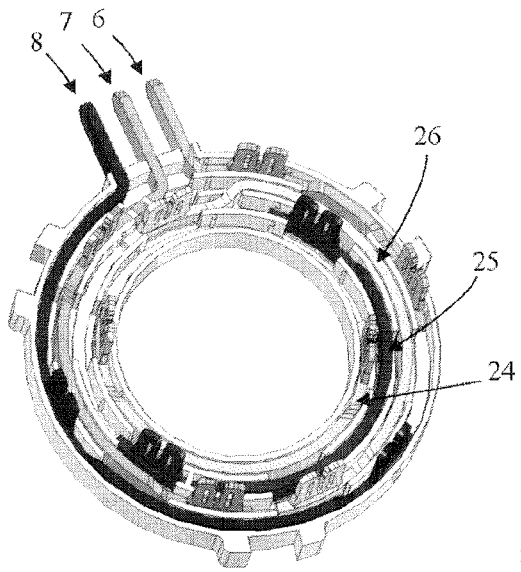
Figure 15B:
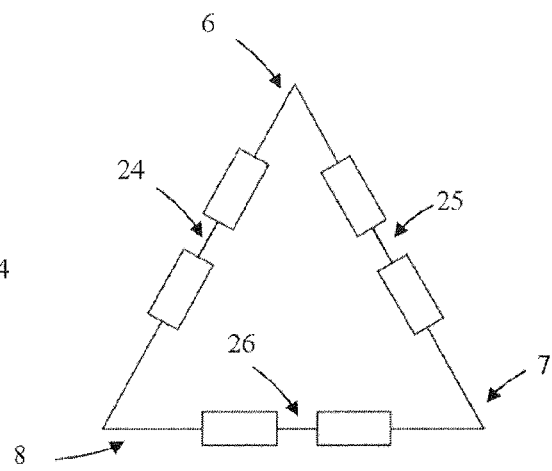
Figure 16A:
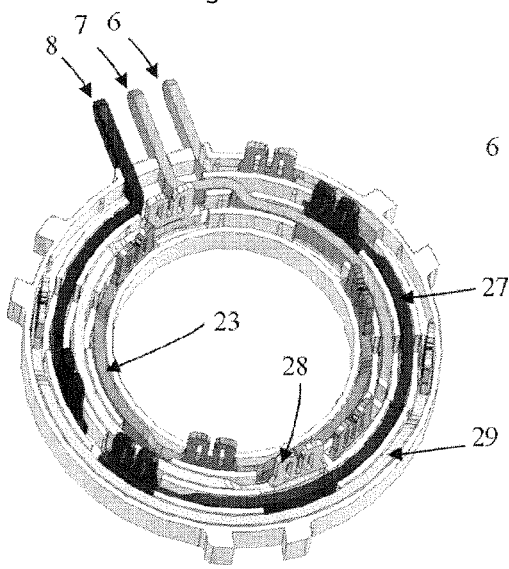
Figure 16B:
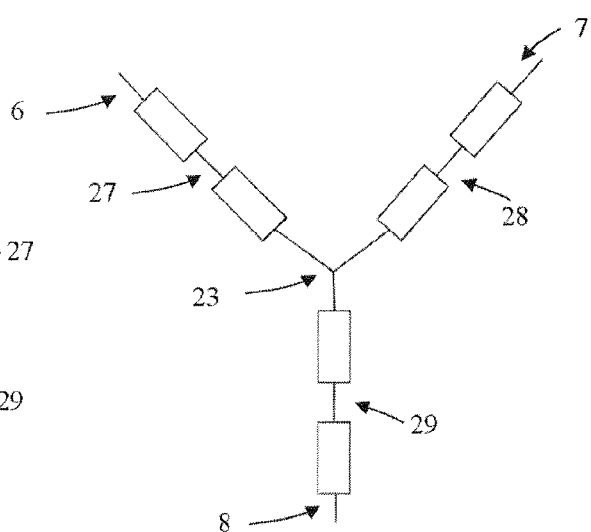

The invention will be better understood upon reading the following description while referring to the appended drawings, wherein:

FIG. 1 shows a connector described by the present invention,

FIG. 2 shows an assembly of electric plugs on an isolated view which is a part of the connector of FIG. 1, FIG. 3 shows an example of a first copper track designed to be connected to a wire guide, FIG. 4 shows an example of a second copper track designed to be connected to a wire guide, FIG. 5 shows an example of a third copper track designed to be connected to a wire guide, FIG. 6 shows a connection support designed to receive the copper tracks, FIG. 7 shows the wire guide intended to be connected to a wound stator assembly, FIG. 8a shows the connector support mounted with the copper tracks, FIG. 8b diagrammatically shows the parallel triangle type connection provided with the tracks shown in FIGS. 3, 4 and 5, FIG. 8c shows a separate view of the winding+stator assembly, FIG. 9 shows an exploded view of the connector, the wound assembly, the connector support assembly with the tracks and the wire guides, FIG. 10 shows an exploded view of the connector, the wound assembly, the connector support for the connection with the tracks, the wire guides and a printed circuit, FIG. 11 shows an exploded view of the connector, the wound assembly, the connection support assembly with the tracks, the wire guide, a printed circuit and an encoder assembly intended to provide the management of the switching of the motor phases, FIG. 12 shows an over-moulded motor with a lateral connection outlet, FIG. 13 shows a separate view of the connector in the over-moulded shape thereof, FIGS. 14a and 14b show a second embodiment of the connector assembly designed for a six winding star connection, connected two by two in parallel, FIGS. 15a and 15b show a third embodiment of the connector assembly designed for a triangle connection of six windings connected two by two in series, FIGS. 16a and 16b show a fourth embodiment of the connector assembly designed for a star connection with six windings connected two by two in parallel.

FIG. 1 shows a connector 1 which is a component of the connector assembly claimed by this patent. This connector 1 provides the exit of eight electric plugs 5 connecting for example the probes of an encoder as well as passages 2 for connector thimbles of three electrical phases of a motor.

On the top of the connector 1, the eight connection plugs 5 exit in 4 to be connected to a printed circuit.

FIG. 2 shows an isolated view of the plugs 5 for the connection with lower exits 3 intended to be connected with an external member managing the supply and the reading of signals going through such plugs 5, i.e. the signals from an encoder of the position, for example in the shape of Hall probes.

FIGS. 3, 4 and 5 have three electrical tracks 6, 7 and 8 in a wound shape and each terminating with a thimble 9 intended to exit through the connector passage 2. Such tracks also include wire grips 10 designed to clamp the wires 22 of the motor winding outlets. In the present case, such three tracks 6, 7 and 8 provide the electrical connection of six windings in a triangle configuration with two parallel windings per phase. Each track 6 is thus connected to four windings to provide two by two an electrical supply phase, as schematically shown in FIG. 8b. The wound shape makes it possible to limit the part cutting costs.

Finally, the assembly of such three tracks 6 makes it possible to provide the three phases of the motor in a limited number of parts.

The three electrical tracks 6, 7 and 8 are connected via the wire grips 10 to the windings and are then integrally fixed together using a connector support 11, as shown in FIG. 8a which takes each of such tracks 6, 7 and 8 in order to align vertically the thimbles 9, so that they exit towards the connector 1. For this purpose, each one of the tracks 6, 7 and 8 has a thimble which, according to the considered track, is more or less axially shifted with respect to the other.

The connection of the wires 22 of each electrical winding of the motor to each one of the tracks 6, 7 and 8 is provided using a wire guide 12, shown in FIG. 7, which is axially positioned above the winding heads, and which is fixed on the stator 21 of the motor. The windings are so positioned that they show the ends of the wires 22 upwards, as shown in FIG. 8c and the wire guide 12 is connected with such ends so as to provide the positioning thereof. Once the wire guide 12 is positioned above the windings, the connection of the conductive tracks 6, 7 and 8 is provided thanks to the slots 13 which let the wire grips 10 through, and wherein the ends of the wire are positioned. The clamping of the wires 22 and the electric connection are thus provided.

FIG. 9 shows the assembly of the six windings 16 connected with the wire guide 12. The connector support 11 including the three tracks 6, 7 and 8 mounted thereon show the three thimbles 9 exiting the connector 1. The connector 1 thus shows the electrical connections of the motor and the encoder on only one connector 1 placed laterally with respect to the motor axis. The connector 1+tracks 6, 7 and 8+connector support 11 assembly are shown in FIG. 9 close to the windings 16+wire guides 12 assembly.

In FIG. 10, the windings 16+wire guides 12 assembly is connected to the connector 1+tracks 6, 7 and 8+connector support 11 assembly. The printed circuit 17 whereon Hall's probes required for the encoding assembly managing the position of the motor rotor opposition, is connected to the connecting plugs 5.

FIG. 11 shows the same assemblies with concentric magnetic tracks 18 and 21, which are integral with the rotor 19 of the motor 20, which makes it possible, using Hall's probes positioned on the printed circuit 17, to read the position of the rotor of the motor. Such magnetic tracks 18 and 21 are advantageously concentric and have different pole pitches, so that they can provide a complete safety when reading the position, and so that they can consider various driving modes (start, continuous operation). In FIG. 11, the first external magnetic track 18 is composed of fifteen pairs of magnetic poles and it is associated with two Hall probes. The second magnetic track 21 is composed of five pairs of magnetic poles and it is associated with three Hall probes. Thus, there is a need for seven connector plugs 5 at least exiting towards the connector 1 from the printed circuit 17. Such connector 1 thus has eight plugs 5, one of which is connected to no probe associated with three thimbles 9 supplying the motor and thus forming a single connector 1.

With this encoding assembly, the motor can similarly be driven with one or the other of the magnetic tracks 18 and 21 associated with Hall probes.

Such FIG. 11 also shows, on the lower exit of the motor 20, a rotor 19 extended by a screw which is a non-limitative example of what can be used as an exit in order to control an external load.

FIG. 12 shows one embodiment, wherein the motor has a cylindrical shape and the connector laterally exits. Such example shows the over-moulded motor 20 in the final shape thereof, formed with the assemblies described hereabove which is over-moulded but which lets the outlet of the lateral connector free on the over-moulded motor 20 to enable the connection and supply and management of electric signals on the over-moulded motor 20 as well as the encoder of the position of the rotor of the motor.

FIG. 13 is an isolated view of the connector 1 over-moulded with the motor 20. On such FIG. 13, the elements of the electrical connection of the motor are grouped on only one connector 1, and have the shape of three thimbles 9 and the elements for managing the encoder here having the shape of eight plugs 3.

A preferred embodiment has been examined here which describes the triangle connector of a 3-phase assembly with six windings, connected in parallel two by two, per phase which is the simplest embodiment as regards the number of parts. Of course, it is possible to imagine a varied number of triangle or star connector assemblies with an assembly of M windings according to the same teachings without leaving the scope of the invention, the number of copper tracks varying according to the connection mode and the total number of windings.

For example and as shown in FIGS. 14a and 14b, in the case of a star parallel connection of six windings, one additional track 23 would be needed and added to the three already described hereabove 6, 7 and 8, without any exit thimble, so that the six windings can be connected together.

For example and as shown in FIGS. 15a and 15b, in the case of a series of triangle connection of six windings, three additional tracks at least would be necessary 24, 25 and 26, and added to the three already described above 6, 7, 8, without any exit thimble so as to connect each winding belonging to one phase together.

For example again and as shown in FIGS. 16a and 16b, in the case of a series of star connections of six windings, four additional tracks 23, 27, 28 and 29 would be needed and added to the three already described hereabove 6, 7 and 8 without any exit thimble so as to connect together three windings with three phases and together each winding of the same phase.

The invention claimed is:

1. An electrical connector assembly for a brushless electromagnetic motor, comprising
 a 3-phase electrical stator winding and X windings per phase, connected in series or in parallel, the electrical connector assembly being axially positioned above the winding heads and comprising
 a circular wire guide with slots configured to hold the ends of the wires of the windings and provide the positioning thereof, wherein the slots are also configured to allow wire grips to extend therethrough, and
 a connector support comprising at least three circular connector tracks, each being terminated with a thimble and having axially extending wire grips to ensure electrical contact for the 3 phases of the motor by clamping,
 wherein the wire guide is positioned above the windings, and the ends of the wires are positioned through the slots of the wire guide and wherein the thimbles exit the motor via a connector, and
 wherein the slots allow wire grips to extend therethrough, and wherein the wire grips clamp the wires, and electrical connections are provided.

2. An electrical connector assembly for a brushless electromagnetic motor according to claim 1, wherein the connector receives Y plugs connected to a printed circuit.

3. An electrical connector assembly for a brushless electromagnetic motor according to claim 2, wherein the three electrical connector thimbles of the motor and the Y plugs of the encoder belong to the same connector at a motor outlet.

4. An electrical connector assembly for a brushless electromagnetic motor according to claim 3, wherein the connector has the shape of a matrix having 3+Y openings letting the three thimbles for the electrical connection of the motor and the Y plugs for the electric management of the encoder through.

5. An electrical connector assembly for a brushless electromagnetic motor according to claim 1 wherein the motor and the connector assembly are over-moulded in one assembly.

* * * * *